United States Patent [19]

Ikari

[11] Patent Number: 4,645,312
[45] Date of Patent: Feb. 24, 1987

[54] PHOTOGRAPHIC LENS SYSTEM

[75] Inventor: Kazuo Ikari, Tokyo, Japan

[73] Assignee: Olympus Optical Co., Ltd., Tokyo, Japan

[21] Appl. No.: 552,965

[22] Filed: Nov. 17, 1983

[30] Foreign Application Priority Data

Nov. 24, 1982 [JP] Japan .................. 57-204603

[51] Int. Cl.$^4$ ................................ G02B 9/62
[52] U.S. Cl. .......................... 350/464; 350/463
[58] Field of Search .................. 350/464, 465, 468

[56] References Cited

U.S. PATENT DOCUMENTS 4,057,328 11/1977 Matsubara ................... 350/464
4,165,916 8/1979 Nakamura .................... 350/464

FOREIGN PATENT DOCUMENTS 56-95207 8/1981 Japan .

Primary Examiner—John K. Corbin
Assistant Examiner—P. M. Dzierzynski
Attorney, Agent, or Firm—Cushman, Darby & Cushman

[57] ABSTRACT

A photographic lens system having a field angle of 70° or wider and designed for use with compact cameras having a relative aperture of F/3.5 comprising a first positive meniscus lens component having a convex surface on the object side, a second positive meniscus lens component having a convex surface on the object side, a third negative meniscus lens component having a convex surface on the object side, a fourth lens component having positive refractive power, and a fifth lens component comprising a negative lens element and having positive refractive power as a whole.

7 Claims, 6 Drawing Figures

PHOTOGRAPHIC LENS SYSTEM

BACKGROUND OF THE INVENTION (a) Field of the Invention

The present invention relates to a photographic lens system having a field angle of 70° to wider and designed for use with a compact camera (adopting for a photographic lens and a view finder which are designed as separate units) having a relative aperture of F/3.5.

(b) Description of the Prior Art

As lens systems for use with a compact camera, there have conventionally been known triplet type, Tessar type and variant types thereof. However, these conventional photographic lens systems had field angles on the order of 60° at maximum. Recently, there are known the so-called telephoto type of lens systems having short total lengths for compact cameras comprising a positive front lens group and a negative rear lens group. These lens systems are also designed for field angles on the order of 60° to 65°.

Generally, it is important to favorably correct curvature of field for obtaining a lens system having a large field angle. In order to correct curvature of field, it is necessary to minimize Petzval sum, and for this purpose in turn, it is necessary to arrange a negative lens component in the lens system. As this nagative lens component has a lower refractive index, Petzval sum is smaller and curvature of field is correted more favorably. In a lens system for use with compact cameras, positive lens components are arranged on the front side of the lens system for shortening the distance as measured from the first lens surface to the film surface (hereinafter referred to as "total length of lens system"). In order to obtain a shorter total length of lens system, these positive lens components must have higher refractive power, which allows negative spherical aberration to be aggravated. Therefore, it is general to arrange a negative lens component between these positive lens components so as to correct curvature of field by minimizing Petzval sum and, at the same time, correct the negative spherical aberration. The function to correct this negative spherical aberration is more effective when the object side surface of the negative lens component is concave toward object to be photographed and has smaller radius of curvature since the paraxial ray incident on this surface has large angle of incidence at higher level on the surface. Therefore, a lower refractive index of this negative lens component is more advantageous for correcting curvature of field and spherical aberration. When this surface has a small radius of curvature, however, it produces coma since angle of incidence is largely different between the upper and lower rays of the offaxial ray incident on this surface at large field angle. Therefore, coma is aggravated abruptly at larger field angle. For this reason, it has hitherto been difficult to design a lens system having a field angle of 70° or larger for use with compact cameras.

As a conventional example having a lens composition similar to that of the lens system according to the present invention, there has already known the one disclosed by Japanese Unexamined Published Patent Application No. 95207/81. This lens system is designed compact but has a field angle on the order of 60° to 65°.

SUMMARY OF THE INVENTION

A general object of the present invention is to provide a photographic lens system having a field angle of 70° or wider and designed for use with compact cameras wherein production of coma is prevented by using a negative meniscus lens component having a convex surface on the object side as a third lens component, the negative spherical aberration correcting function weakened by said third lens component is supplemented by arranging a first and second positive meniscus lens components each having a convex surface on the object side, whereby production of spherical aberration is minimized.

The photographic lens system according to the present invention comprises a first positive meniscus lens component having a convex surface on the object side, a second positive meniscus lens component having a convex surface on the object side, a third negative meniscus lens component having a convex surface on the object side, a fourth lens component having positive refractive power, and a fifth lens component comprising a negative lens element and having positive refractive power as a whole. Further, the lens system according to the present invention is so designed as to satisfy the conditions mentioned below:

$$1.5/f < 1/r_1 < 3.0/f \tag{1}$$

$$0 < 1/r_5 < 1.2/f \tag{2}$$

wherein the reference symbols are defined as follows:
$r_1$: radius of curvature on the object side surface of said first lens component
$r_5$: radius of curvature on the object side surface of said third lens component
$f$: focal length of the lens system as a whole The condition (1) defines curvature on the object side surface of said first lens component. When this surface has a large curvature, the paraxial ray has a larger angle of incidence at higher level on the surface and subjected to stronger refraction when the lens system is focused on an object located at a short distance. The negative spherical aberration is aggravated accordingly. In other words, a curvature on the object side surface of the first lens component exceeding the upper limit of the condition (1) allows spherical aberration to have a large negative value when the lens system is focused on an object located at a short distance. If the lower limit of the condition (1) is exceeded, in contrast, the first lens component has weaker refractive power, and the second lens component must have stronger power for making up for the weakened power of the first lens component. Accordingly, the second lens component produces negative spherical aberration at a too large a degree to be corrected.

The condition (2) defines curvature on the object side surface of said third lens component. If $1/r_5$ is smaller than the lower limit of the condition (2), coma will be aggravated. if the upper limit of the condition (2) is exceeded, in contrast, it will be impossible to correct spherical aberration.

The lens system having the above-described lens constraction and satisfying the conditions (1) and (2) can accomplish the object of the present invention. However, a more favorable lens system can be obtained by designing it as described below:

In order to design the first and second lens components so as to produce less spherical aberraiton, it is desirable to select refractive index $n_1$ of the first lens component and refractive index $n_2$ of the second lens component so as to satisfy the following condition (3):

$$1.7 < (n_1 + n_2)/2 \quad (3)$$

If this condition (3) is not satisfied, the first and second lens components will produce negative spherical aberration at an uncorrectable degree.

It is desirable to design the fifth lens component as a lens component comprising a negative lens element arranged on the extreme image side and having weakly positive refractive power as a whole. By arranging a negative lens element on the extreme image side as described above, it is possible to make the lens system have the lens constraction similar to that of so-called telephoto type, shorten total length of the lens system and minimize diameter of the rear lens component. However, this negative lens element produces positive distortion. Therefore, it is advantageous for preventing production of distortion to design this negative lens element as a meniscus element having a convex surface on the image side. Further, focal length $f_{5n}$ of this negative lens element should desirably satisfy the following condition (4):

$$0.5 < |f_{5n}|/f < 7.0, \quad f_{5n} < 0 \quad (4)$$

If $f_{5n}$ is smaller than the lower limit of the condition (4), positive distortion will be aggravated. If $f_{5n}$ exceeds the upper limit of the condition (4), in contrast, total length of the lens system will be prolonged and diameter of the rear lens component will be enlarged, making the lens system unsuited for use with compact cameras.

DETAILED DESCRIPTION OF THE PREFERRED EMBODIMENTS

Figure 1:
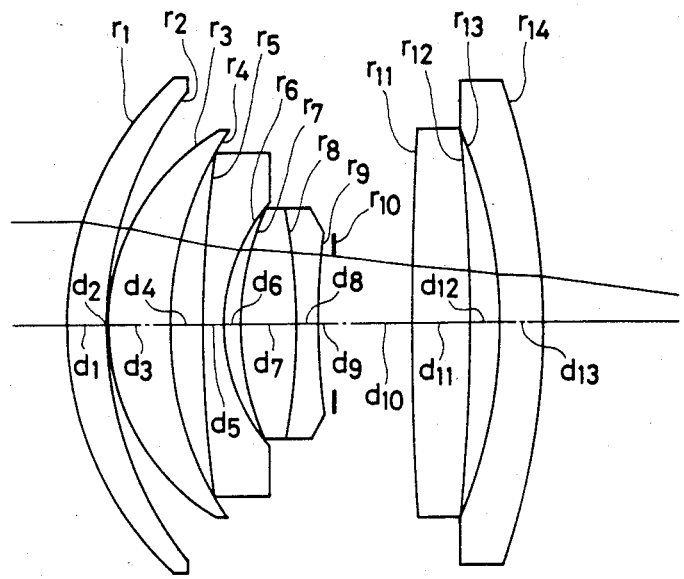
FIG. 1 shows a sectional view illustrating lens composition of embodiments 1, 2 and 4 of the photographic lens system according to the present invention.

Now, numerical data will be described as preferred embodiments of the photographic lens system according to the present invention:

Embodiment 1
$r_1 = 46.5365$
$\quad d_1 = 5.8088 \quad n_1 = 1.81600 \quad \nu_1 = 46.62$
$r_2 = 53.2225$
$\quad d_2 = 0.3335$
$r_3 = 31.3160$
$\quad d_3 = 8.3383 \quad n_2 = 1.81600 \quad \nu_2 = 46.62$
$r_4 = 50.8091$
$\quad d_4 = 4.3359$
$r_5 = 182.3270$
$\quad d_5 = 2.9044 \quad n_3 = 1.76182 \quad \nu_3 = 26.55$
$r_6 = 25.7941$
$\quad d_6 = 2.5559$
$r_7 = 39.6304$
$\quad d_7 = 7.8127 \quad n_4 = 1.72000 \quad \nu_4 = 46.03$
$r_8 = -80.2598$
$\quad d_8 = 2.9174 \quad n_5 = 1.51633 \quad \nu_5 = 64.15$
$r_9 = 118.9013$
$\quad d_9 = 2.3235$
$r_{10} = \infty \text{ (stop)}$
$\quad d_{10} = 10.8922$
$r_{11} = 447.5011$ -continued $\quad d_{11} = 8.3328 \quad n_6 = 1.77250 \quad \nu_6 = 49.66$
$r_{12} = -212.8122$
$\quad d_{12} = 3.9982$
$r_{13} = -65.0478$
$\quad d_{13} = 6.6671 \quad n_7 = 1.59270 \quad \nu_7 = 35.29$
$r_{14} = -87.3047$
$f = 100, \quad F/3.5, \quad |f_{5n}|/f = 4.845$ Embodiment 2
$r_1 = 52.1997$
$\quad d_1 = 5.8063 \quad n_1 = 1.81600 \quad \nu_1 = 46.62$
$r_2 = 59.0464$
$\quad d_2 = 0.3334$
$r_3 = 29.9107$
$\quad d_3 = 7.3346 \quad n_2 = 1.81600 \quad \nu_2 = 46.62$
$r_4 = 45.7540$
$\quad d_4 = 5.3342$
$r_5 = 131.7944$
$\quad d_5 = 2.9031 \quad n_3 = 1.76182 \quad \nu_3 = 26.55$
$r_6 = 23.8092$
$\quad d_6 = 2.5548$
$r_7 = 33.5841$
$\quad d_7 = 7.8093 \quad n_4 = 1.72000 \quad \nu_4 = 43.70$
$r_8 = -84.0763$
$\quad d_8 = 2.9162 \quad n_5 = 1.51633 \quad \nu_5 = 64.15$
$r_9 = 79.8070$
$\quad d_9 = 2.3225$
$r_{10} = \infty \text{ (stop)}$
$\quad d_{10} = 14.1832$
$r_{11} = 609.6062$
$\quad d_{11} = 8.3347 \quad n_6 = 1.77250 \quad \nu_6 = 49.66$
$r_{12} = -139.9410$
$\quad d_{12} = 5.5168$
$r_{13} = -133.1382$
$\quad d_{13} = 6.6678 \quad n_7 = 1.59270 \quad \nu_7 = 35.29$
$r_{14} = -354.2207$
$f = 100, \quad F/3.5, \quad |f_{5n}|/f = 3.640$ Embodiment 3
$r_1 = 41.9452$
$\quad d_1 = 7.3333 \quad n_1 = 1.88300 \quad \nu_1 = 40.76$
$r_2 = 48.7535$
$\quad d_2 = 0.3333$
$r_3 = 35.9194$
$\quad d_3 = 7.0000 \quad n_2 = 1.88300 \quad \nu_2 = 40.76$
$r_4 = 57.7933$
$\quad d_4 = 4.6667$
$r_5 = 596.2729$
$\quad d_5 = 2.9026 \quad n_3 = 1.84666 \quad \nu_3 = 23.88$
$r_6 = 32.2834$
$\quad d_6 = 2.5543$
$r_7 = 51.1059$
$\quad d_7 = 9.9157 \quad n_4 = 1.72000 \quad \nu_4 = 41.98$
$r_8 = -284.3712$
$\quad d_8 = 1.4667$
$r_9 = \infty \text{ (stop)}$
$\quad d_9 = 10.9788$
$r_{10} = 623.4936$
$\quad d_{10} = 15.6985 \quad n_5 = 1.80610 \quad \nu_5 = 40.95$
$r_{11} = -87.3058$
$\quad d_{11} = 5.3328$
$r_{12} = -50.1661$
$\quad d_{12} = 4.6822 \quad n_6 = 1.58267 \quad \nu_6 = 46.33$
$r_{13} = -250.0457$
$f = 100, \quad F/3.5, \quad |f_{5n}|/f = 1.086$ Embodiment 4
$r_1 = 53.0930$
$\quad d_1 = 5.8053 \quad n_1 = 1.81600 \quad \nu_1 = 46.62$
$r_2 = 59.9196$
$\quad d_2 = 0.3333$
$r_3 = 29.5248$
$\quad d_3 = 8.3333 \quad n_2 = 1.81600 \quad \nu_2 = 46.62$
$r_4 = 49.9079$
$\quad d_4 = 4.3333$
$r_5 = 139.2884$
$\quad d_5 = 2.9026 \quad n_3 = 1.76182 \quad \nu_3 = 26.55$
$r_6 = 23.8537$
$\quad d_6 = 2.5543$
$r_7 = 37.4819$
$\quad d_7 = 7.8080 \quad n_4 = 1.72000 \quad \nu_4 = 43.70$
$r_8 = -80.2117$
$\quad d_8 = 2.9157 \quad n_5 = 1.51633 \quad \nu_5 = 64.15$
$r_9 = 97.2536$ -continued

| | | | |
|---|---|---|---|
| | $d_9 = 2.3221$ | | |
| $r_{10} = \infty$ (stop) | | | |
| | $d_{10} = 13.9245$ | | |
| $r_{11} = 327.4500$ | | | |
| | $d_{11} = 8.7942$ | $n_6 = 1.77250$ | $v_6 = 49.66$ |
| $r_{12} = -293.7912$ | | | |
| | $d_{12} = 5.8477$ | | |
| $r_{13} = -66.4262$ | | | |
| | $d_{13} = 7.3688$ | $n_7 = 1.59270$ | $v_7 = 35.29$ |
| $r_{14} = -87.7115$ | | | |
| | $f = 100,$ | $F/3.5,$ | $|f_{5n}|/f = 5.301$ | wherein the reference symbols $r_1, r_2, \ldots$ represent radii of curvature on the surfaces of the respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements and the reference symbols $v_1, v_2, \ldots$ represent Abbe's numbers of the respective lens elements.

Figure 2:
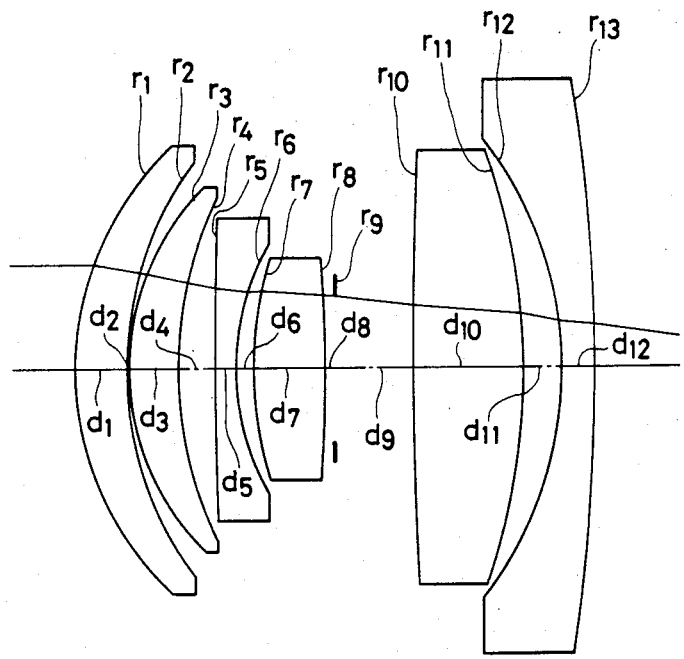
FIG. 2 shows a sectional view illustrating lens composition of an embodiment 3 of the lens system according to the present invention.
Figure 3:
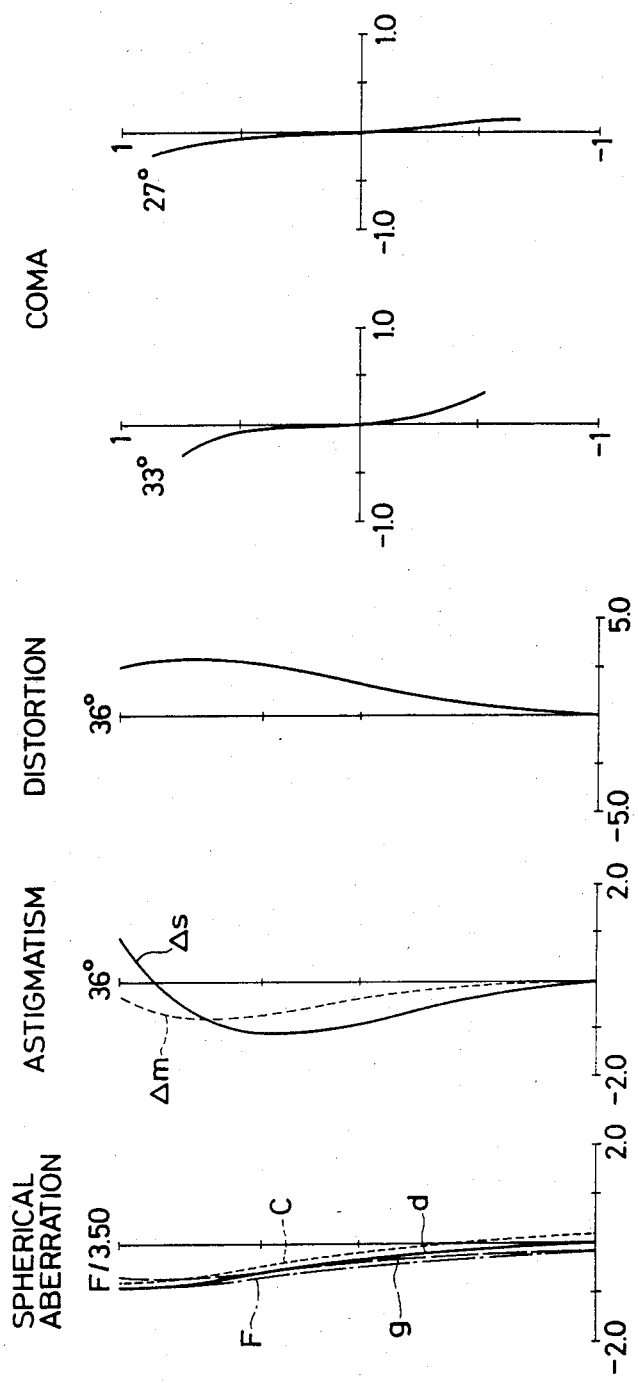
FIG. 3 through FIG. 6 show curves illustrating aberration characteristics of the Embodiments 1 through 4 respectively.
Figure 4:
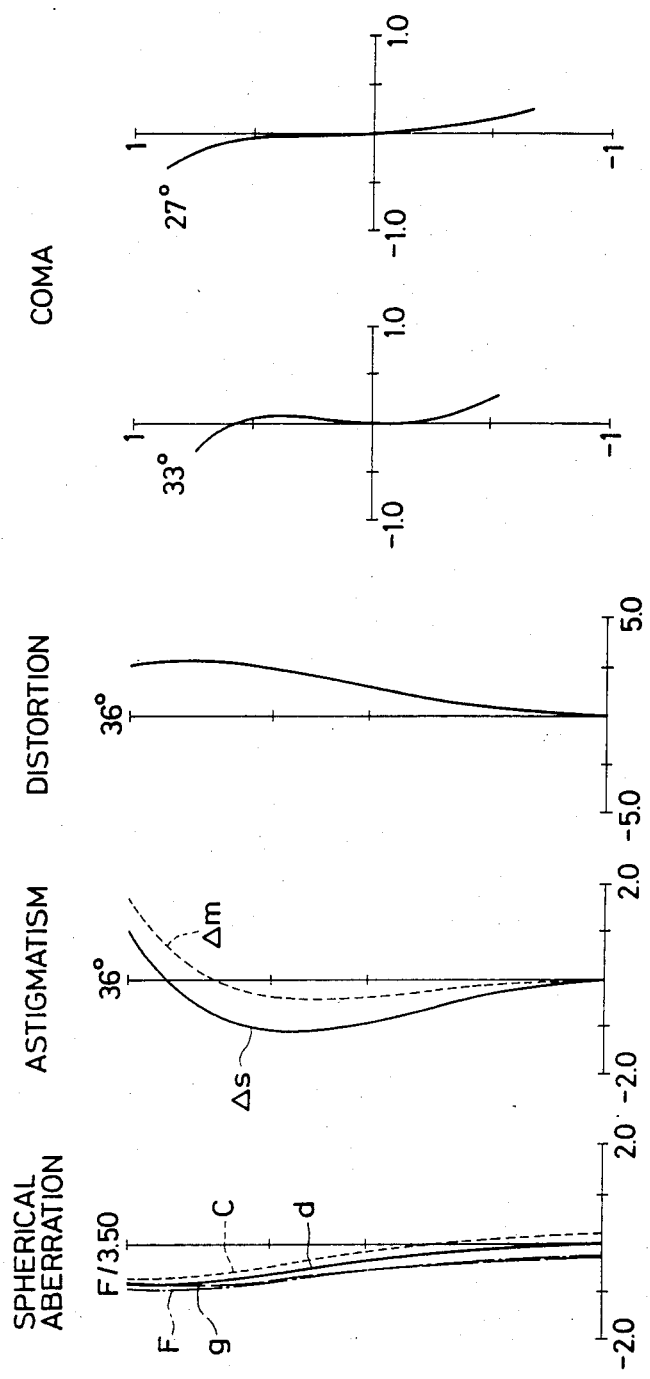
Figure 5:
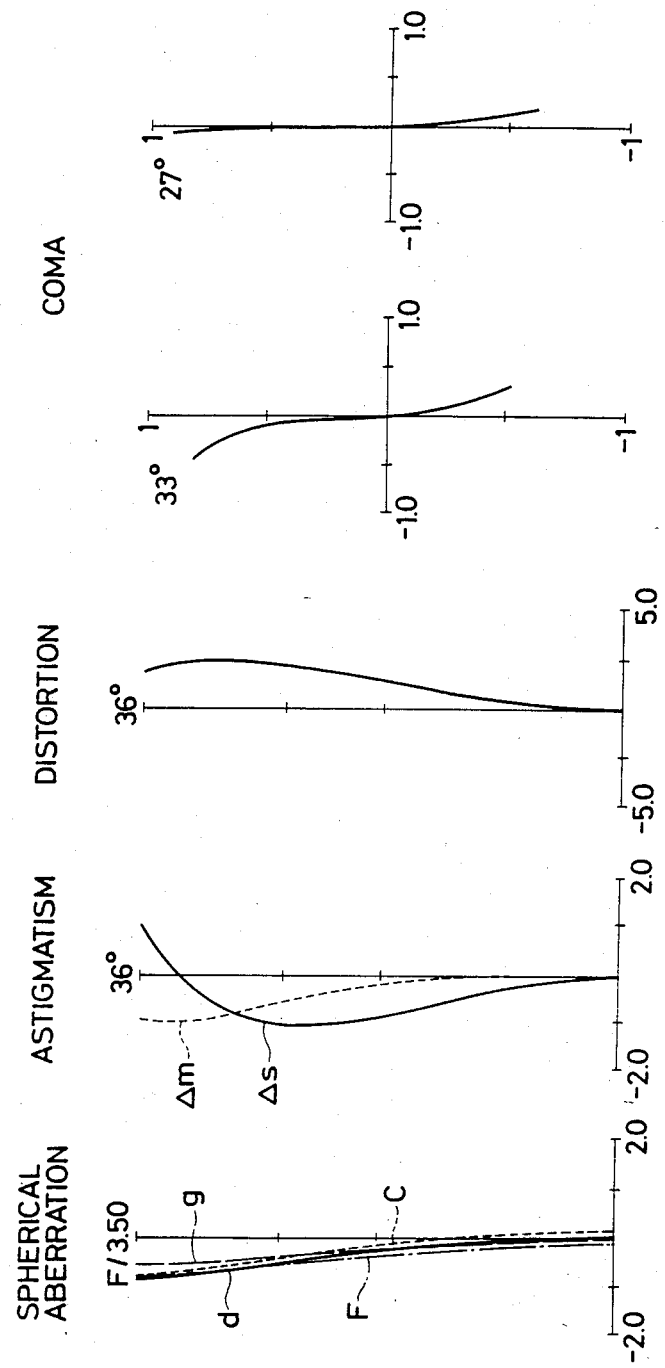
Figure 6:
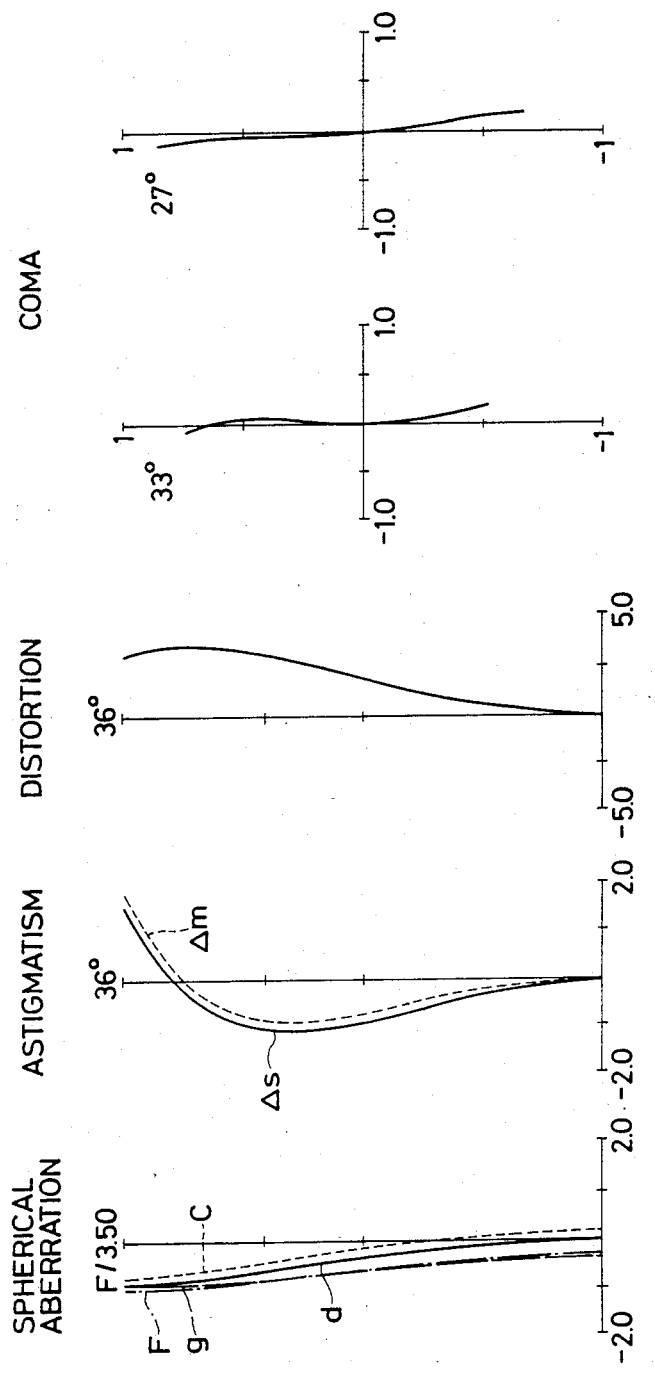

In all the embodiments described above, the fifth lens component comprises a positive element and a negative element. The Embodiments 1, 2 and 4 have the lens composition illustrated in FIG. 1 in which the fourth lens component is a cemented doublet. The Embodiment 3 has the lens composition shown in FIG. 2 in which the fourth lens component consists of a single element.

I claim:

1. A photographic lens system comprising a first positive meniscus lens component having a convex surface on the object side, a second positive meniscus lens component having a convex surface on the object side, a third negative meniscus lens component having a convex surface on the object side, a fourth lens component having positive refractive power, and a fifth lens component comprising a negative lens element and having positive refractive power as a whole, said negative lens element in said fifth lens component being arranged on the extreme image side and being a negative meniscus lens, and said lens system being so designed as to satisfy the following conditions (1), (2), (3) and (4):

$$1.5/f < 1/r_1 < 3.0/f \quad (1)$$

$$0 < 1/r_5 < 1.2/f \quad (2)$$

$$1.7 < (n_1 + n_2)/2 \quad (3)$$

$$0.5 < |f_{5n}|/f < 7.0, \ f_{5n} < 0 \quad (4)$$

wherein the reference symbol $f$ represents focal length of the lens system as a whole, the reference symbol $r_1$ designates radius of curvature on the object side surface of said first lens component, the reference symbol $r_5$ denotes radius of curvature on the object side surface of said third lens component, the reference symbols $n_1$ and $n_2$ represent refractive indices of said first and second lens components respectively, and the reference symbol $f_{5n}$ designates focal length of the negative element comprised in said fifth lens component.

2. A photographic lens system according to claim 1 wherein said forth lens component is a positive cemented doublet, and said fifth lens component consists of a positive element and a negative element.

3. A photographic lens system according to claim 1 wherein said fourth lens component consists of a single positive element, and said fifth lens component consists of a positive element and a negative element.

4. A photographic lens system according to claim 2 having the following numerical data:

| | | | |
|---|---|---|---|
| $r_1 = 46.5365$ | | | |
| | $d_1 = 5.8088$ | $n_1 = 1.81600$ | $v_1 = 46.62$ |
| $r_2 = 53.2225$ | | | |
| | $d_2 = 0.3335$ | | |
| $r_3 = 31.3160$ | | | |
| | $d_3 = 8.3383$ | $n_2 = 1.81600$ | $v_2 = 46.62$ |
| $r_4 = 50.8091$ | | | |
| | $d_4 = 4.3359$ | | |
| $r_5 = 182.3270$ | | | |
| | $d_5 = 2.9044$ | $n_3 = 1.76182$ | $v_3 = 26.55$ |
| $r_6 = 25.7941$ | | | |
| | $d_6 = 2.5559$ | | |
| $r_7 = 39.6304$ | | | |
| | $d_7 = 7.8127$ | $n_4 = 1.72000$ | $v_4 = 46.03$ |
| $r_8 = -80.2598$ | | | |
| | $d_8 = 2.9174$ | $n_5 = 1.51633$ | $v_5 = 64.15$ |
| $r_9 = 118.9013$ | | | |
| | $d_9 = 2.3235$ | | |
| $r_{10} = \infty$ (stop) | | | |
| | $d_{10} = 10.8922$ | | |
| $r_{11} = 447.5011$ | | | |
| | $d_{11} = 8.3328$ | $n_6 = 1.77250$ | $v_6 = 49.66$ |
| $r_{12} = -212.8122$ | | | |
| | $d_{12} = 3.9982$ | | |
| $r_{13} = -65.0478$ | | | |
| | $d_{13} = 6.6671$ | $n_7 = 1.59270$ | $v_7 = 35.29$ |
| $r_{14} = -87.3047$ | | | |
| | $f = 100,$ | $F/3.5,$ | $|f_{5n}|/f = 4.845$ | wherein the reference symbols $r_1, r_2, \ldots$ represent radii of curvautre on the surfaces of the respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements and the reference symbols $v_1, v_2, \ldots$ represent Abbe's numbers of the respective lens elements.

5. A photographic lens system according to claim 2 having the following numerical data:

| | | | |
|---|---|---|---|
| $r_1 = 52.1997$ | | | |
| | $d_1 = 5.8063$ | $n_1 = 1.81600$ | $v_1 = 46.62$ |
| $r_2 = 59.0464$ | | | |
| | $d_2 = 0.3334$ | | |
| $r_3 = 29.9107$ | | | |
| | $d_3 = 7.3346$ | $n_2 = 1.81600$ | $v_2 = 46.62$ |
| $r_4 = 45.7540$ | | | |
| | $d_4 = 5.3342$ | | |
| $r_5 = 131.7944$ | | | |
| | $d_5 = 2.9031$ | $n_3 = 1.76182$ | $v_3 = 26.55$ |
| $r_6 = 23.8092$ | | | |
| | $d_6 = 2.5548$ | | |
| $r_7 = 33.5841$ | | | |
| | $d_7 = 7.8093$ | $n_4 = 1.72000$ | $v_4 = 43.70$ |
| $r_8 = -84.0763$ | | | |
| | $d_8 = 2.9162$ | $n_5 = 1.51633$ | $v_5 = 64.15$ |
| $r_9 = 79.8070$ | | | |
| | $d_9 = 2.3225$ | | |
| $r_{10} = \infty$ (stop) | | | |
| | $d_{10} = 14.1832$ | | |
| $r_{11} = 609.6062$ | | | |
| | $d_{11} = 8.3347$ | $n_6 = 1.77250$ | $v_6 = 49.66$ |
| $r_{12} = -139.9410$ | | | |
| | $d_{12} = 5.5168$ | | |
| $r_{13} = -133.1382$ | | | |
| | $d_{13} = 6.6678$ | $n_7 = 1.59270$ | $v_7 = 35.29$ |
| $r_{14} = -354.2207$ | | | |
| | $f = 100,$ | $F/3.5,$ | $|f_{5n}|/f = 3.640$ | wherein the reference symbols $r_1, r_2, \ldots$ represent radii of curvature on the surfaces of the respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements and the reference symbols $\nu_1, \nu_2, \ldots$ represent Abbe's numbers of the respecitve lens elements.

6. A photographic lens system according to claim 3 having the following numerical data:

| | | | |
|---|---|---|---|
| $r_1 = 41.9452$ | | | |
| | $d_1 = 7.3333$ | $n_1 = 1.88300$ | $\nu_1 = 40.76$ |
| $r_2 = 48.7535$ | | | |
| | $d_2 = 0.3333$ | | |
| $r_3 = 35.9194$ | | | |
| | $d_3 = 7.0000$ | $n_2 = 1.88300$ | $\nu_2 = 40.76$ |
| $r_4 = 57.7933$ | | | |
| | $d_4 = 4.6667$ | | |
| $r_5 = 596.2729$ | | | |
| | $d_5 = 2.9026$ | $n_3 = 1.84666$ | $\nu_3 = 23.88$ |
| $r_6 = 32.2834$ | | | |
| | $d_6 = 2.5543$ | | |
| $r_7 = 51.1059$ | | | |
| | $d_7 = 9.9157$ | $n_4 = 1.72000$ | $\nu_4 = 41.98$ |
| $r_8 = -284.3712$ | | | |
| | $d_8 = 1.4667$ | | |
| $r_9 = \infty$ (stop) | | | |
| | $d_9 = 10.9788$ | | |
| $r_{10} = 623.4936$ | | | |
| | $d_{10} = 15.6985$ | $n_5 = 1.80610$ | $\nu_5 = 40.95$ |
| $r_{11} = -87.3058$ | | | |
| | $d_{11} = 5.3328$ | | |
| $r_{12} = -50.1661$ | | | |
| | $d_{12} = 4.6822$ | $n_6 = 1.58267$ | $\nu_6 = 46.33$ |
| $r_{13} = -250.0457$ | | | |
| | $f = 100,$ | $F/3.5,$ | $|f_{5n}|/f = 1.086$ | wherein the reference symbols $r_1, r_2, \ldots$ represent radii of curvature on the surfaces of the respective lens elements, the reference symbols $d_1, d_2, \ldots$ designate thicknesses of the respective lens elements and airspaces reserved therebetween, the reference symobls $n_1, n_2, \ldots$ denote refracitve indices of the respective lens elements and the reference symbols $\nu_1, \nu_2, \ldots$ represent Abbe's numbers of the respective lens elements.

7. A photographic lens system according to claim 2 having the following numerical data:

| | | | |
|---|---|---|---|
| $r_1 = 53.0930$ | | | |
| | $d_1 = 5.8053$ | $n_1 = 1.81600$ | $\nu_1 = 46.62$ |
| $r_2 = 59.9196$ | | | |
| | $d_2 = 0.3333$ | | |
| $r_3 = 29.5248$ | | | |
| | $d_3 = 8.3333$ | $n_2 = 1.81600$ | $\nu_2 = 46.62$ |
| $r_4 = 49.9079$ | | | |
| | $d_4 = 4.3333$ | | |
| $r_5 = 139.2884$ | | | |
| | $d_5 = 2.9026$ | $n_3 = 1.76182$ | $\nu_3 = 26.55$ |
| $r_6 = 23.8537$ | | | |
| | $d_6 = 2.5543$ | | |
| $r_7 = 37.4819$ | | | |
| | $d_7 = 7.8080$ | $n_4 = 1.72000$ | $\nu_4 = 43.70$ |
| $r_8 = -80.2117$ | | | |
| | $d_8 = 2.9157$ | $n_5 = 1.51633$ | $\nu_5 = 64.15$ |
| $r_9 = 97.2536$ | | | |
| | $d_9 = 2.3221$ | | |
| $r_{10} = \infty$ (stop) | | | |
| | $d_{10} = 13.9245$ | | |
| $r_{11} = 237.4500$ | | | |
| | $d_{11} = 8.7942$ | $n_6 = 1.77250$ | $\nu_6 = 40.66$ |
| $r_{12} = -293.7912$ | | | |
| | $d_{12} = 5.8477$ | | |
| $r_{13} = -66.4262$ | | | |
| | $d_{13} = 7.3688$ | $n_7 = 1.59270$ | $\nu_7 = 35.29$ |
| $r_{14} = -87.7115$ | | | |
| | $f = 100,$ | $F/3.5,$ | $|f_{5n}|/f = 5.301$ | wherein the reference symbols $r_1, r_2, \ldots$ represent radii of curvature on the surfaces of the respective lens elements, the reference symbols $d_1, d_2, \ldots$ designate thicknesses of the respective lens elements and airspaces reserved therebetween, the referece symbols $n_1, n_2, \ldots$ denote refracitve indices of the respective lens elements and the reference symbols $\nu_1, \nu_2, \ldots$ represent Abbe's numbers of the respective lens elements.

* * * * *